United States Patent
Child et al.

(10) Patent No.: US 8,114,791 B2
(45) Date of Patent: *Feb. 14, 2012

(54) STATIC DISSIPATIVE TEXTILE

(75) Inventors: Andrew D. Child, Moore, SC (US); Alfred R. Deangelis, Spartanburg, SC (US)

(73) Assignee: Sage Automtive Interiors, Inc., Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/881,439

(22) Filed: Jul. 27, 2007

(65) Prior Publication Data

US 2007/0270063 A1   Nov. 22, 2007

Related U.S. Application Data

(63) Continuation of application No. 10/244,207, filed on Sep. 16, 2002, now Pat. No. 7,320,947.

(51) Int. Cl.
*B32B 5/02* (2006.01)
*B32B 27/04* (2006.01)
*B32B 5/16* (2006.01)
*B32B 3/06* (2006.01)

(52) U.S. Cl. ............... 442/110; 442/64; 442/65; 442/66; 442/67; 442/68; 442/117; 428/103

(58) Field of Classification Search .............. 442/64–68, 442/110, 117, 109; 428/103
See application file for complete search history.

(56) References Cited

U.S. PATENT DOCUMENTS

| | | | |
|---|---|---|---|
| 4,307,144 A | 12/1981 | Sanders et al. | 428/240 |
| 4,365,551 A | 12/1982 | Horton | 101/124 |
| 4,528,222 A | 7/1985 | Rzepecki et al. | 428/35 |
| 4,557,968 A | 12/1985 | Thornton et al. | 428/229 |
| 4,606,968 A | 8/1986 | Thornton et al. | 428/229 |
| 4,803,096 A | 2/1989 | Kuhn et al. | 427/121 |
| 4,814,586 A | 3/1989 | Grise | 219/549 |

(Continued)

FOREIGN PATENT DOCUMENTS

AU   2003256865 A1   4/2004

(Continued)

OTHER PUBLICATIONS

International Search Report mailed on Jan. 16, 2004 in PCT/US2003/024684.

*Primary Examiner* — Lynda Salvatore
(74) *Attorney, Agent, or Firm* — Smith Moore Leatherwood LLP; Thomas W. Epting

(57) ABSTRACT

The present invention relates generally to a static dissipative textile having an electrically conductive surface achieved by coating the textile with an electrically conductive coating in a variety of patterns. The electrically conductive coating is comprised of a conducting agent and a binding agent, and optionally a dispersing agent and/or a thickening agent. The static dissipative textile generally comprises a fabric which may be screen printed or otherwise coated with a conductive coating on the backside of the fabric so that the conductive coating does not interfere with the appearance of the face of the fabric. The economically produced fabric exhibits relatively permanent static dissipation properties and conducts electric charge at virtually any humidity, while the conductive coating does not detrimentally affect the overall appearance or tactile properties of the fabric. Also encompassed within this invention is a method for producing a static dissipative textile having an electrically conductive surface.

15 Claims, 8 Drawing Sheets

U.S. PATENT DOCUMENTS

| | | | | |
|---|---|---|---|---|
| 4,822,835 A | 4/1989 | Close | | 524/114 |
| 4,837,902 A | 6/1989 | Dischler | | 26/1 |
| 4,854,230 A | 8/1989 | Niki et al. | | 101/123 |
| 4,877,646 A | 10/1989 | Kuhn et al. | | 427/121 |
| 4,881,642 A | 11/1989 | Adam | | 206/328 |
| 4,918,795 A | 4/1990 | Dischler | | 26/1 |
| 4,975,317 A | 12/1990 | Kuhn et al. | | 428/253 |
| 4,981,718 A | 1/1991 | Kuhn et al. | | 427/121 |
| 5,030,508 A | 7/1991 | Kuhn et al. | | 428/253 |
| 5,137,542 A * | 8/1992 | Buchanan et al. | | 51/295 |
| 5,156,906 A | 10/1992 | Holland | | 442/93 |
| 5,168,805 A | 12/1992 | Kasanami et al. | | 101/128.21 |
| 5,254,268 A | 10/1993 | Schwartz | | 252/8.6 |
| 5,292,573 A | 3/1994 | Adams, Jr. et al. | | 428/196 |
| 5,316,830 A * | 5/1994 | Adams et al. | | 428/195.1 |
| 5,320,781 A | 6/1994 | Stahlecker et al. | | 252/518.1 |
| 5,324,627 A | 6/1994 | Stevenson et al. | | 430/510 |
| 5,493,969 A | 2/1996 | Takahashi et al. | | 101/126 |
| 5,525,411 A | 6/1996 | Stewart et al. | | 428/236 |
| 5,560,753 A | 10/1996 | Schnabel et al. | | 51/295 |
| 5,622,925 A | 4/1997 | De Buzzaccarini et al. | | 510/329 |
| 5,624,736 A | 4/1997 | DeAngelis et al. | | 428/736 |
| 5,643,865 A | 7/1997 | Mermelstein et al. | | 510/521 |
| 5,720,892 A | 2/1998 | DeAngelis et al. | | 216/7 |
| 5,804,291 A | 9/1998 | Fraser, Jr. | | 428/283 |
| 5,822,835 A | 10/1998 | Dischler | | 28/167 |
| 5,853,877 A | 12/1998 | Shibuta | | 478/357 |
| 5,863,847 A | 1/1999 | De Voe et al. | | 442/151 |
| 6,001,749 A | 12/1999 | Child et al. | | 442/71 |
| 6,093,910 A | 7/2000 | McClintock et al. | | 219/217 |
| 6,237,490 B1 | 5/2001 | Takahashi et al. | | 101/129 |
| 6,372,829 B1 * | 4/2002 | Lamanna et al. | | 524/99 |
| 6,395,121 B1 | 5/2002 | De Bastiani | | 156/250 |
| 6,527,834 B1 | 3/2003 | Jorder et al. | | 96/68 |
| 6,602,437 B1 * | 8/2003 | Miller et al. | | 252/8.62 |
| 7,320,947 B2 * | 1/2008 | Child et al. | | 442/110 |
| 7,635,439 B2 | 12/2009 | Child et al. | | |
| 2003/0013798 A1 | 1/2003 | Iino et al. | | 524/495 |
| 2004/0038605 A1* | 2/2004 | Hooper | | 442/59 |
| 2004/0051082 A1 | 3/2004 | Child et al. | | |

FOREIGN PATENT DOCUMENTS

| | | |
|---|---|---|
| EP | 0 847 787 | 6/1998 |
| EP | 0 997 565 | 10/1999 |
| EP | 1542861 A1 | 6/2005 |
| GB | 1 459 590 | 12/1976 |
| GB | 1 531 984 | 11/1978 |
| JP | 05086573 * | 4/1993 |
| JP | 2005539150 T | 12/2005 |
| WO | WO 93 25745 | 12/1993 |
| WO | 2004024436 A1 | 3/2004 |

* cited by examiner

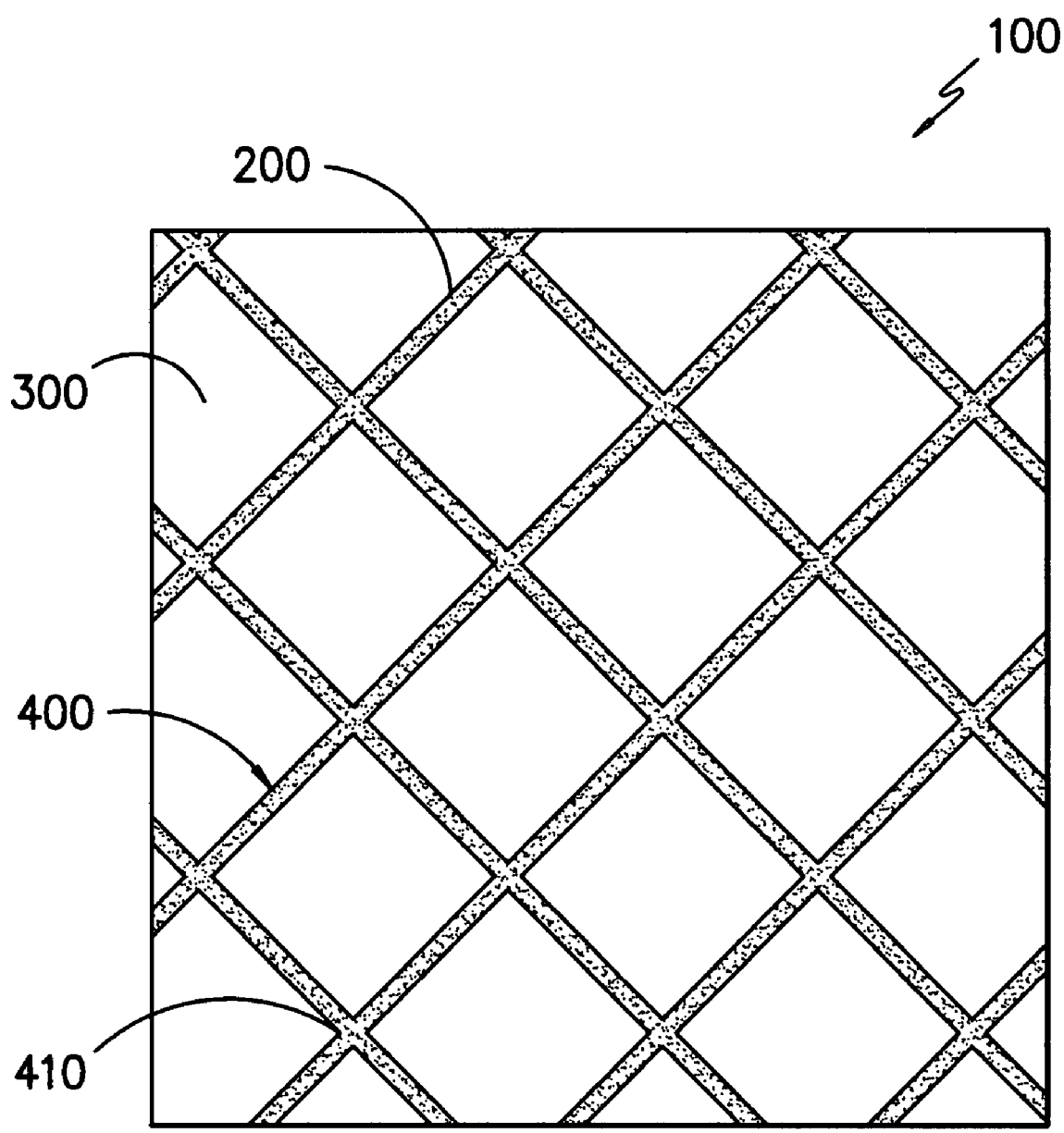
FIG. -1-

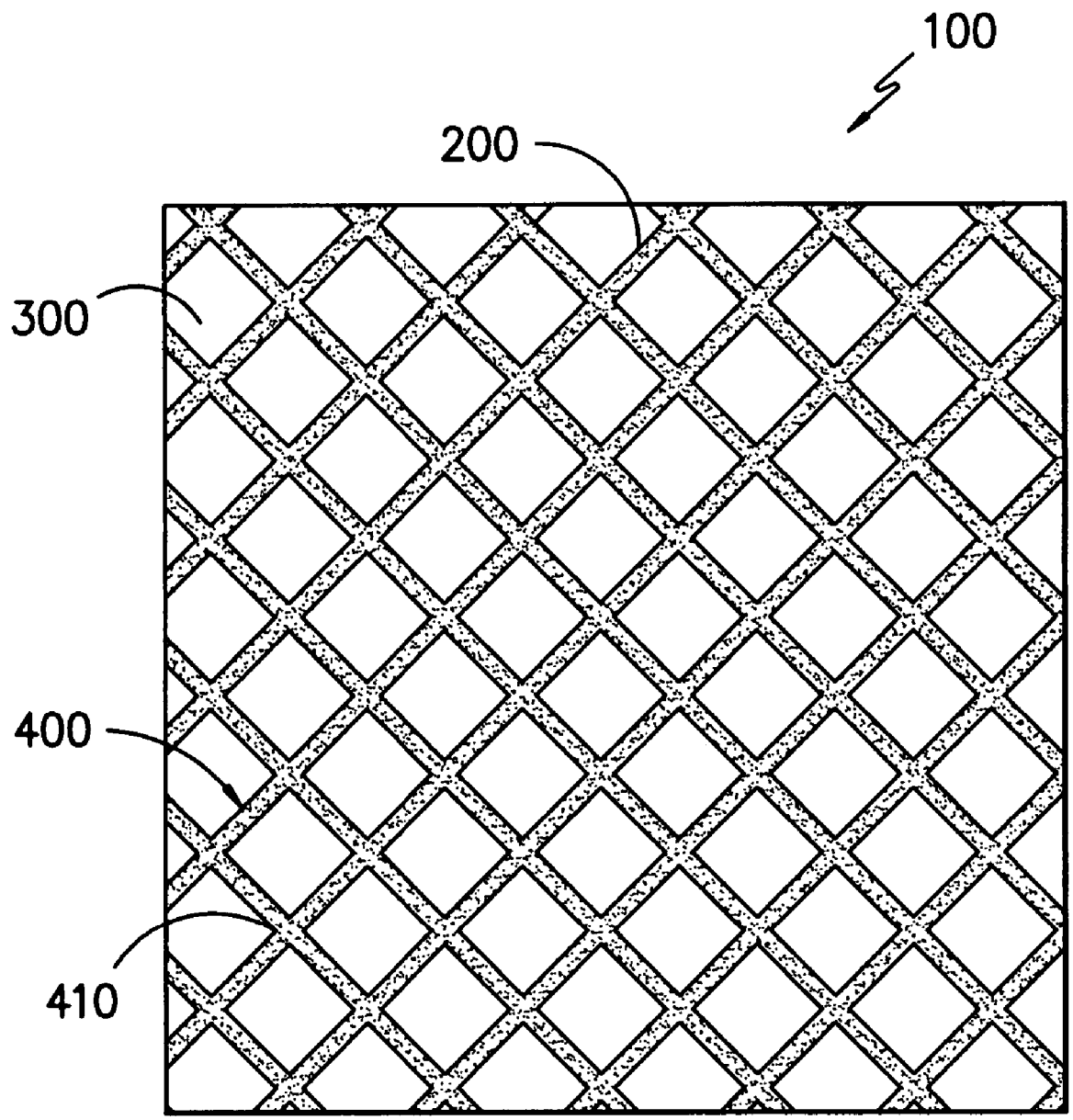
FIG. -2-

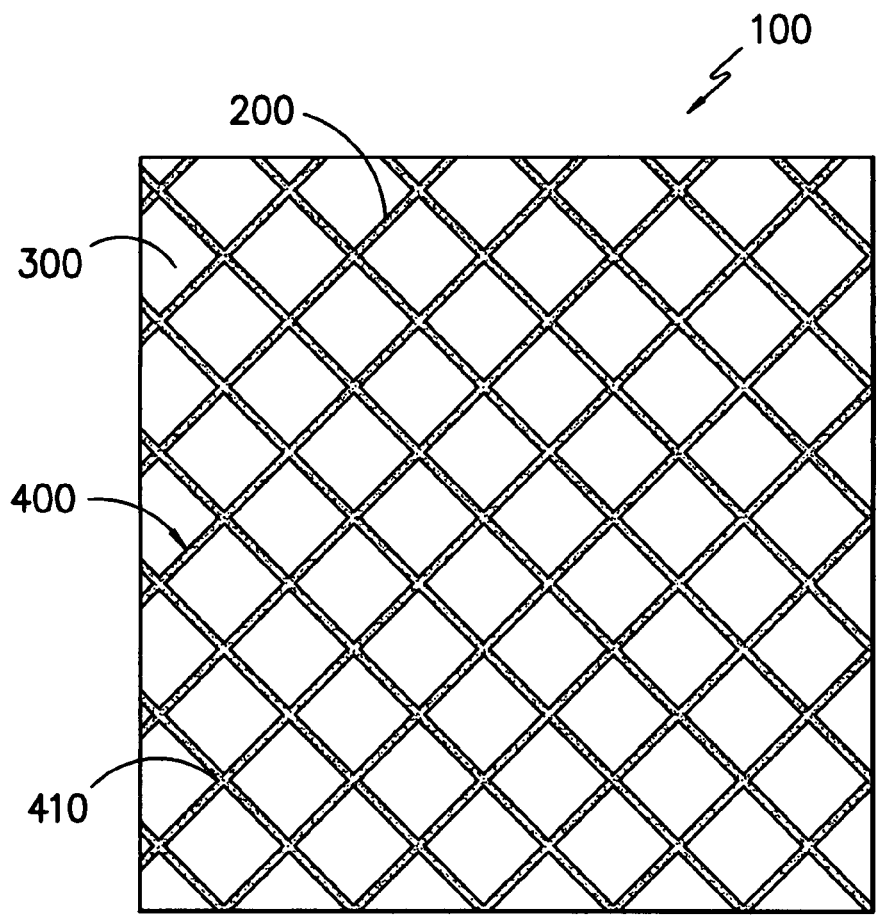
FIG. -3-
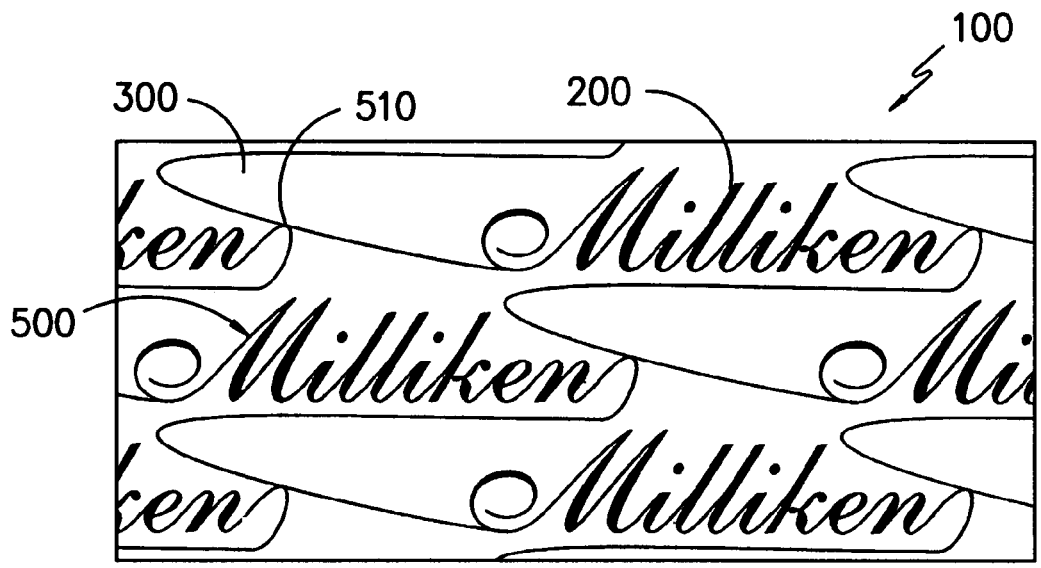
FIG. -4-

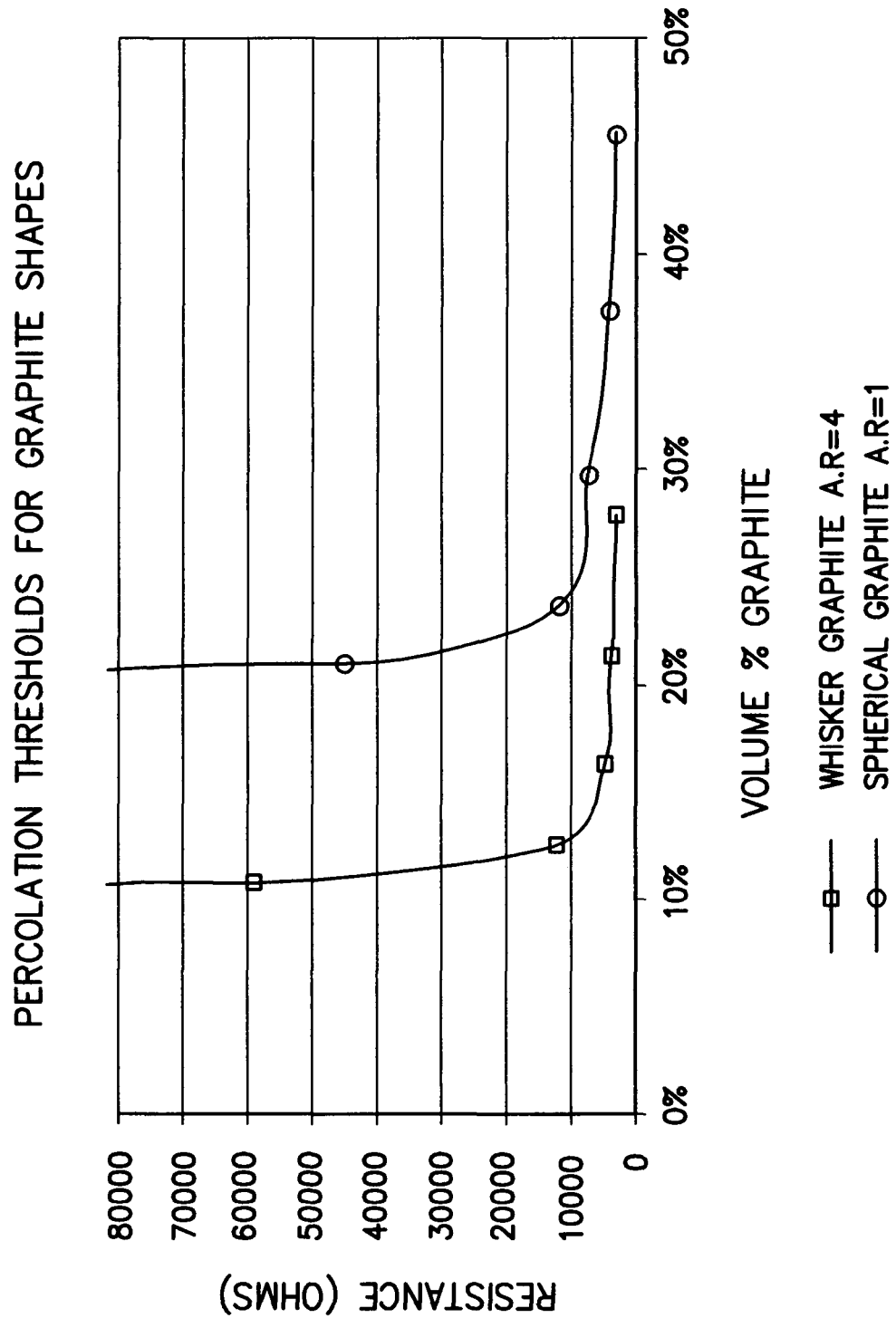
FIG. -5-

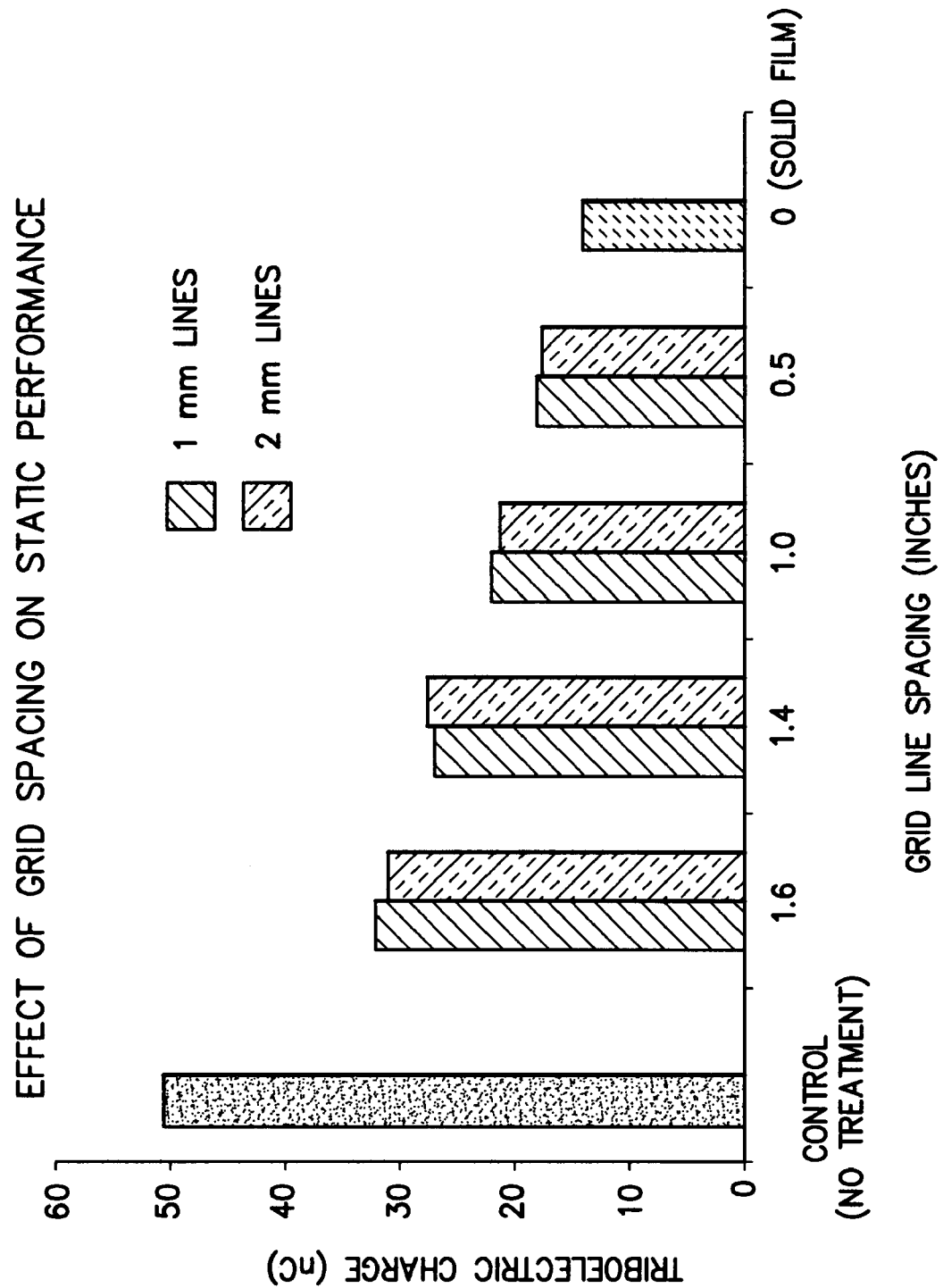
FIG. -6-

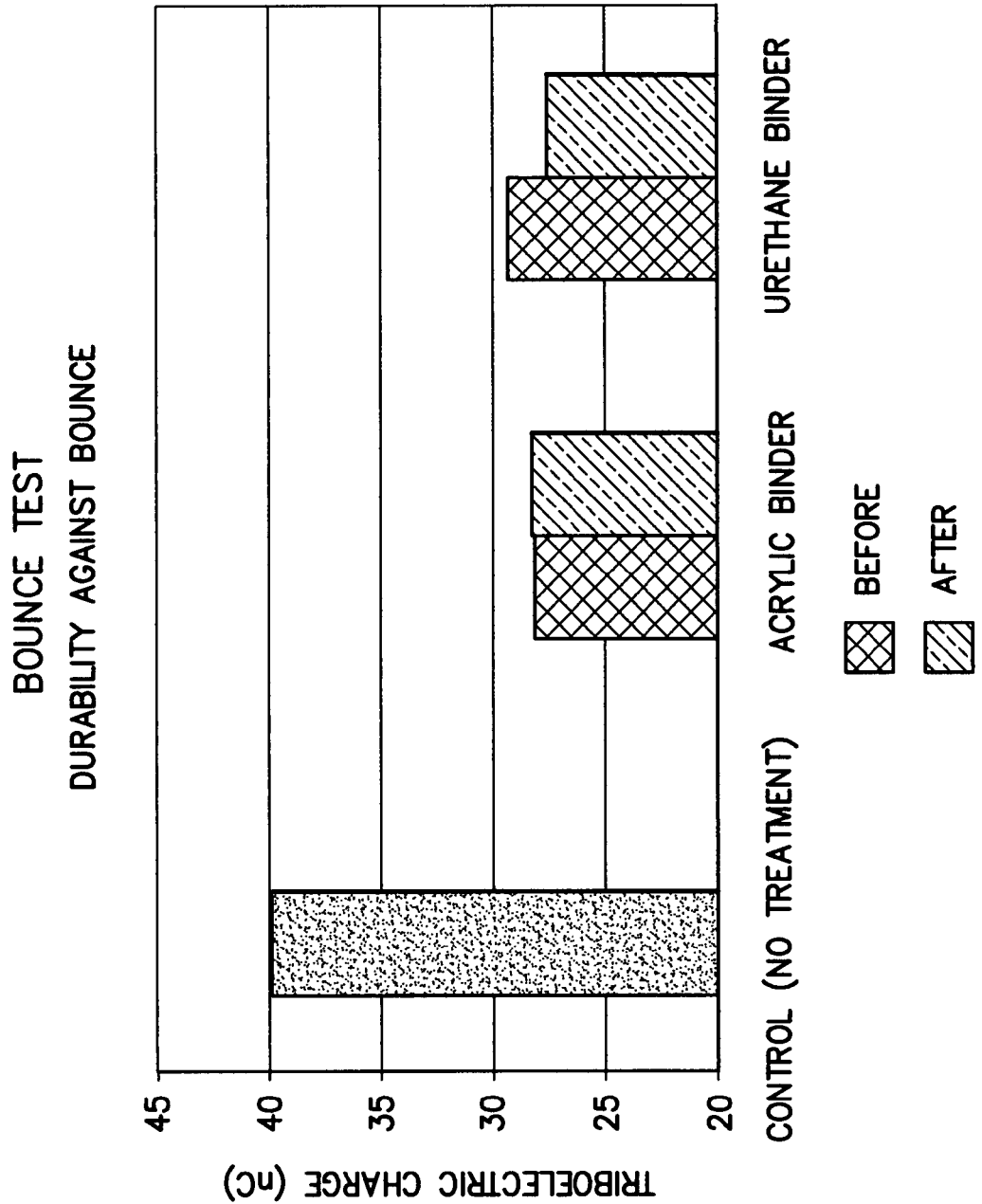
FIG. -7-

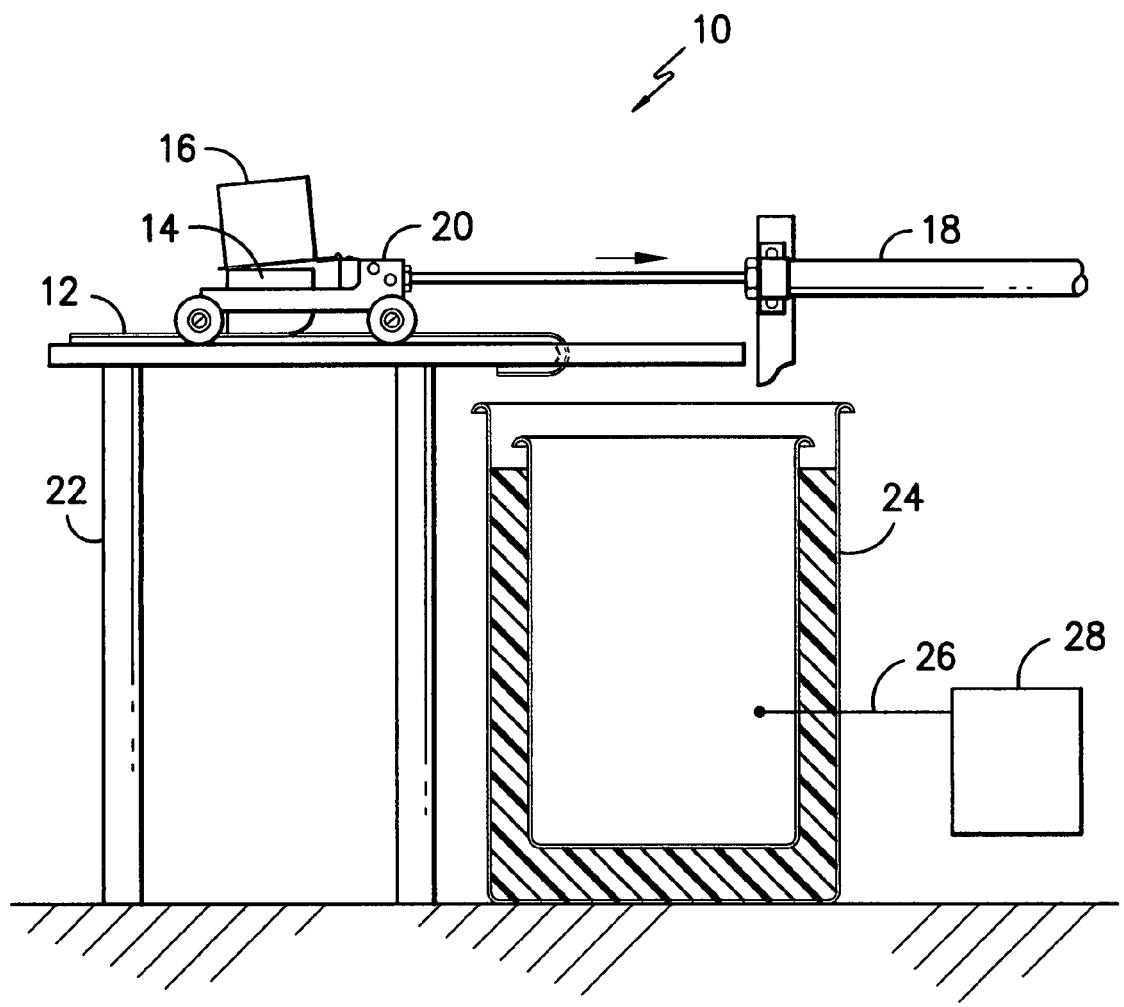
FIG. -8-

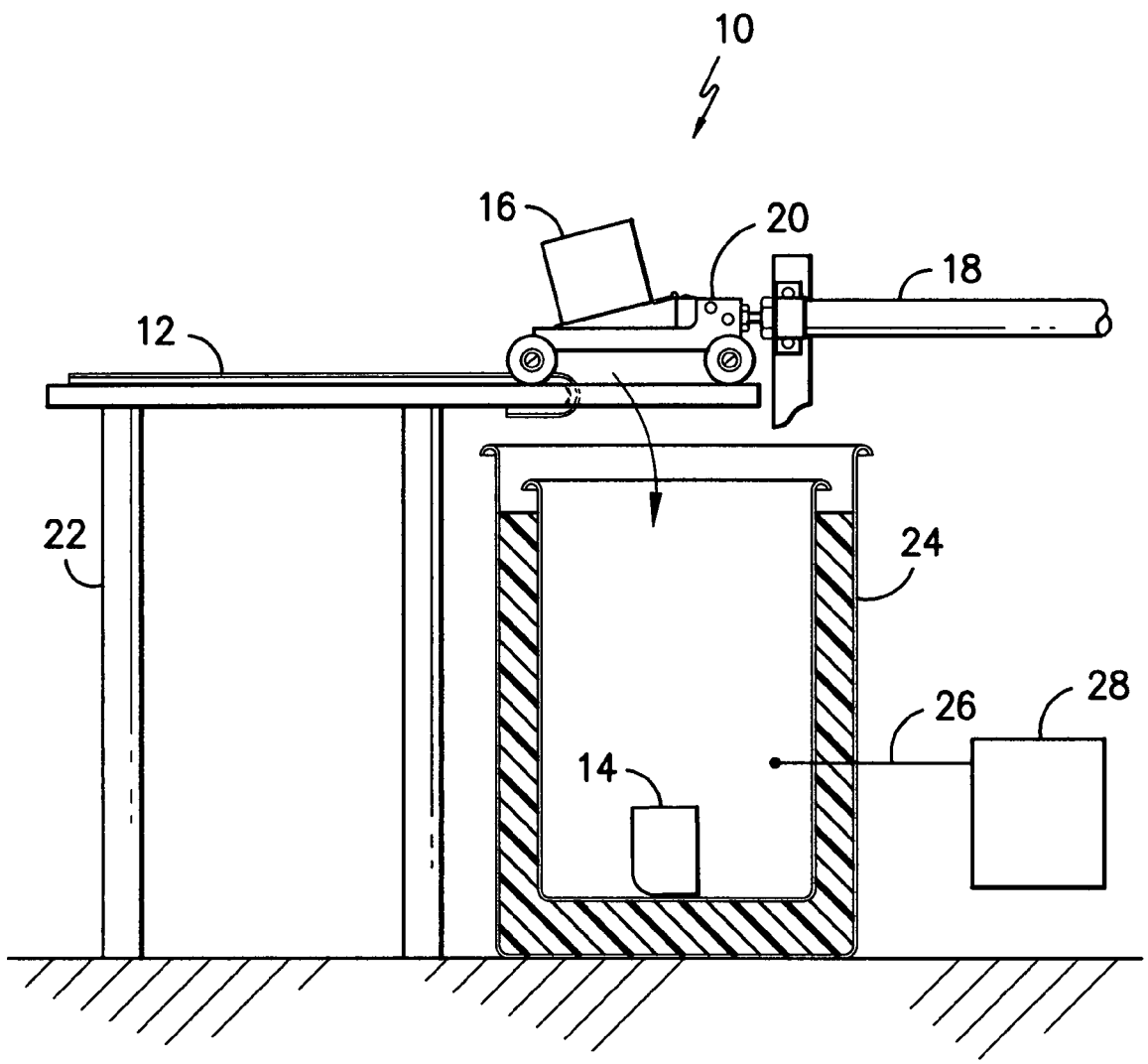
FIG. -9-

STATIC DISSIPATIVE TEXTILE

CROSS-REFERENCE TO RELATED APPLICATIONS

This application is a continuation of U.S. application Ser. No. 10/244,207 filed on Sep. 16, 2002, now U.S. Pat. No. 7,320,947 and claims priority to the prior application for all purposes.

BACKGROUND OF THE INVENTION

The present invention relates generally to a static dissipative textile having an electrically conductive surface which is achieved by coating the textile with an electrically conductive coating in a wide variety of patterns. The electrically conductive coating is generally comprised of a conducting agent and a binding agent, and optionally a dispersing agent and/or a thickening agent. The static dissipative textile generally comprises a fabric which may be screen printed or otherwise coated with an electrically conductive coating on the backside of the fabric so that the conductive coating does not interfere with the appearance of the face of the fabric. The economically produced fabric exhibits relatively permanent static dissipation properties and conducts electric charge at virtually any humidity, while the conductive coating does not detrimentally affect the overall appearance or tactile properties of the fabric. The fabric may be ideal for use in such end-use products as automotive upholstery; commercial and residential upholstery; cleanroom garments, wipes, and mops; napery; and apparel. Also encompassed within this invention is a method for producing a static dissipative textile having an electrically conductive surface.

It is generally known that some textile fabrics have inherent static generation problems, particularly synthetic fabrics such as polyester or nylon, and particularly in low humidity environments. Static generation occurs typically when two objects are brought into contact with each other and then separated. Generation is usually exacerbated when the objects are rubbed against each other, such as, for example, when two fabrics are rubbed against each other, resulting in a charge transfer between the two objects. This resulting potential difference between the object incurring the charge transfer and the surrounding environment, which may be tens of thousands of volts, can lead to uncomfortable and dangerous electric shocks. Static shocks can also result in damage to sensitive electronic components such as computer chips and sensors manufactured, for example, in cleanroom environments. Since one of the objects may be a fabric, the need exists for static dissipative fabrics to eliminate or reduce static electric charge created when an object is separated from a fabric.

One method of reducing the static charge on a fabric is to treat the fabric with a topical anti-static agent. These agents, which are commercially available, are typically quaternary ammonium salts, or ionic solutions containing small ions such as lithium ions. This type of anti-static treatment for fabric is disclosed, for example, in U.S. Pat. No. 5,643,865 to Mermelstein et al., U.S. Pat. No. 5,622,925 to de Buzzaccarini et al., and U.S. Pat. No. 5,254,268 to Schwartz. Other topical agents reduce static shock by lubricating the surface of the fabric with a hand modifier or softening agent thereby decreasing the friction between the fabric and the object rubbed against it. Both of these approaches suffer from a lack of durability to repeating abrasion. The softening agents and conducting finishes are partially removed during each abrasion or rubbing event; thus, the treatment is not permanent. Also, the fabric may develop issues with crocking. In addition, the conducting mechanism of the topical treatments depends on the presence of a small amount of water. Therefore, their effectiveness is quite limited in low humidity environments such as those encountered during winter months.

A method of producing a relatively permanent anti-static fabric that performs at substantially all humidity levels is to provide electrical conductivity to the fabric by the incorporation of conductive yarns into the fabric during the fabric formation process. The number and frequency of the conductive yarns, as well as their proximity to the surface of the fabric generally determine the amount of conductivity, and ultimately the amount of static protection provided by a particular fabric. In order to increase the effectiveness of static dissipation, the conducting yarns should intersect each other, thus forming a conductive grid. This method is used in many end-use applications such as in cleanroom garments and anti-static wipes. This method is disclosed, for example, in U.S. Pat. Nos. 4,557,968 and 4,606,968 both to Thornton et al. However, this method is limited by the high cost of conductive yarns and the cost of weaving, knitting, or stitching fabrics with these conductive yarns. Additionally, these conductive yarns are usually colored such that they may be undesirably visible on the face of the fabric. Furthermore, an end-use determination for a fabric must be made in advance of the fabric formation process so that the conductive yarns may be incorporated into the fabric at the onset of fabric formation.

Still another method of producing anti-static fabrics is to treat the entire surface of the fabric with a conductive paste or coating. This coating can be in the form of an intrinsically conducting polymer, such as that disclosed in U.S. Pat. No. 4,803,096 to Kuhn et al., or in the form of a conductive particle dispersed in a non-conducting matrix such as that described in U.S. Pat. No. 5,804,291 to Fraser. Although these methods overcome the limitations of topical treatments and are generally less expensive than incorporation of conductive yarns, they suffer from the fact that conductive coatings are normally highly colored and are often visible on the face of the fabric when used over the entire surface of the fabric. Also, the hand (or feel), drape, and air porosity of the fabric can be influenced adversely by impregnating the entire surface of the fabric with a matrix containing conductive particles.

Other methods have been disclosed in which an entire substrate is coated with a conductive polymer and then selected portions of the conductive polymer are removed. For example, U.S. Pat. No. 5,624,736 to DeAngelis et al. teaches a method in which a substrate is coated with a conductive polymer across its entire surface. The fabric is then coated in select areas with a protective film. The substrate is then subjected to a third treatment in which a chemical etching agent is used to remove the conductive polymer from the exposed portions of the substrate which were not covered with the protective film. Finally, the substrate is rinsed to remove the excess etching agent. Such a process, with so many operational steps, is rather complicated and lengthy and, like any process which involves coating an entire substrate only to remove large portions of the coating, necessarily involves a good deal of material loss. Also, this method leaves an insulating coating over the conducting areas, thus reducing the effectiveness of static dissipation. This method further suffers from the lack of breathability imparted to the conductive areas by the protective film. Another example of patterned conducting textile materials is disclosed in U.S. Pat. No. 6,001,749 to Child et al. This patent teaches a method in which areas of a fabric are coated with a repellant finish that inhibits the deposition of a conductive coating. The fabric is then coated with a conductive polymer leaving the pre-treated areas substantially free from the conductive polymer. This method leaves the highly colored conductor on the face and back of the fabric, thus detrimentally affecting the appearance, hand, and/or permeability of the fabric. Accordingly, both U.S. Pat. Nos. 6,001,749 and 5,624,736 are generally more suited to applications in Electromagnetic Interference Shielding (EMI).

Thus, a need exists for an economically manufactured fabric with relatively permanent anti-static properties that are inherent at virtually any humidity and does not affect the overall appearance or tactile properties of the fabric.

SUMMARY OF THE INVENTION

In light of the foregoing discussion, it is one object of the current invention to achieve a static dissipative textile having an electrically conductive surface. The static dissipative textile is generally comprised of a fabric. The electrically conductive surface may be achieved by screen printing the fabric with an electrically conductive coating, wherein the conductive coating includes a conducting agent and a binding agent, and optionally a dispersing agent and/or a thickening agent. The fabric may be coated in any pattern which achieves the desired static dissipative property for the fabric's end-use. The fabric may be coated on one or both sides of the fabric as determined generally by the end-use of the fabric by considering the desired appearance of the coated fabric and/or the conductive performance of the coated fabric. The resulting electrically conductive fabric may be suitable in end-use applications such as automotive upholstery and other automotive interior fabrics, such as door panels, armrests, headrests, etc.; commercial and/or residential upholstery; cleanroom garments, wipes and/or other cleanroom accessories such as mops; napery; and apparel.

Another object of the current invention is to achieve a composite material, wherein the static dissipative textile may further comprise at least one layer of a second fabric disposed adjacent to the electrically conductive coating. The second fabric may be woven, knitted, or nonwoven fabric. Alternatively, the static dissipative textile may further comprise at least one layer of foam material disposed adjacent to the electrically conductive coating. The composite material may further include one or more layers of woven, knitted, or nonwoven fabric; one or more layers of film; one or more layers of adhesive; or combinations thereof. The composite material may be used, for example, in automobile interiors, such as in automotive upholstery, wherein the upholstery fabric is typically adhered to a foam backing through the use of adhesive, heat lamination, or the like. The composite material may be applicable for use in other areas such as, for example, in residential or commercial upholstery or in carpeting.

It is also an object of the current invention to achieve a method for producing a static dissipative textile having an electrically conductive surface. The method generally comprises the steps of providing a knitted, woven, or nonwoven fabric, coating one or both sides of the fabric with an electrically conductive coating in a pattern comprised of lines, and drying the fabric. The fabric may then be exposed to one or more mechanical and/or chemical textile finishing processes known to those skilled in the art.

Other objects, advantages, and features of the current invention will occur to those skilled in the art. Thus, while the invention will be described and disclosed in connection with certain preferred embodiments and procedures, such embodiments and procedures are not intended to limit the scope of the current invention. Rather, it is intended that all such alternative embodiments, procedures, and modifications are included within the scope and spirit of the disclosed invention and are limited only by the appended claims and their equivalents.

BRIEF DESCRIPTION OF THE DRAWINGS

FIG. 1 depicts one embodiment for the static dissipative textile of the present invention. The pattern shown is a diagonal grid of intersecting lines which have a line spacing of about 1 inch and a line width of about 2 millimeters. The coating coverage is about 15%.

FIG. 2 depicts another embodiment for the static dissipative textile of the present invention. The pattern shown is a diagonal grid of intersecting lines which have a line spacing of about 0.5 inches and a line width of about 2 millimeters. The coating coverage is about 29%.

FIG. 3 depicts a further embodiment for the static dissipative textile of the present invention. The pattern shown is a diagonal grid of intersecting lines which have a line spacing of about 0.5 inches and a line width of about 1 millimeter. The coating coverage is about 15%.

FIG. 4 depicts yet another embodiment for the static dissipative textile of the present invention. The pattern shown is a series of repeating words which are connected to one another.

FIG. 5 is a graph depicting the percolation thresholds for both graphite whiskers and graphite spheres shown as surface resistance of the fabric versus percent volume of graphite.

FIG. 6 is a bar graph depicting the effect of line spacing and line width on static performance shown as triboelectric charge versus line spacing and line width.

FIG. 7 is a bar graph depicting fabric durability against bounce shown as triboelectric charge versus three types of fabric—a control (no conductive particles present), a static dissipative fabric of the present invention having an acrylic binder, and a static dissipative fabric of the present invention having a urethane binder.

FIG. 8 is a schematic drawing of the static testing machine used to perform the Static Test on the fabric of the present invention. It is displayed in a setup configuration prior to performing the test procedure.

FIG. 9 is a schematic drawing of the static testing machine used to perform the Static Test on the fabric of the present invention. It is displayed in a setup configuration after the test has been performed.

DETAILED DESCRIPTION OF THE INVENTION

A static dissipative textile is provided which has relatively permanent anti-static properties which are achieved at substantially all relative humidities without significantly compromising the textile hand (or feel) of the textile or the surface appearance of the textile. The static dissipative textile generally comprises a fabric coated on at least on side with a pattern of an electrically conductive coating.

The fabric of the current invention can be formed from fibers such as synthetic fibers, natural fibers, or combinations thereof. Synthetic fibers include, for example, polyester, acrylic, polyamide, polyolefin, polyaramid, polyurethane, regenerated cellulose, and blends thereof. More specifically, polyester includes, for example, polyethylene terephthalate, polytriphenylene terephthalate, polybutylene terephthalate, polylatic acid, and combinations thereof. Polyamide includes, for example, nylon 6, nylon 6,6, and combinations thereof. Polyolefin includes, for example, polypropylene, polyethylene, and combinations thereof. Polyaramid includes, for example, poly-p-phenyleneteraphthalamid (i.e., Kevlar®), poly-m-phenyleneteraphthalamid (i.e., Nomex®), and combinations thereof. Natural fibers include, for example, wool, cotton, flax, and blends thereof.

The fabric can be formed from fibers or yarns of any size, including microdenier fibers and yarns (fibers or yarns having less than one denier per filament). Furthermore, the fabric may be partially or wholly comprised of multi-component or bi-component fibers or yarns which may be splittable along their length by chemical or mechanical action. The fabric may be comprised of fibers such as staple fiber, filament fiber, spun fiber, or combinations thereof.

The fabric of the current invention may be of any variety, including but not limited to, woven fabric, knitted fabric, nonwoven fabric, or combinations thereof. They may optionally be colored by a variety of dyeing techniques, such as high temperature jet dyeing with disperse dyes, thermosol dyeing, pad dyeing, transfer printing, screen printing, or any other technique that is common in the art for comparable, equivalent, traditional textile products. If yarns or fibers are treated by the process of the current invention, they may be dyed by suitable methods prior to fabric formation, such as, for instance, by package dyeing or solution dyeing, or after fabric formation as described above, or they may be left undyed.

The electrically conductive coating may be disposed on the fabric in any pattern. The pattern is typically comprised of a plurality of lines. As used herein, a line is defined as a continuous conductive path. Generally, this continuous conductive path is characterized by a conductivity equal to or less than $10^{13}$ ohms per inch. The lines of the pattern may be substantially straight lines, curved lines, or combinations thereof. The lines may form at least one intersection, and they may form a plurality of intersections. As used herein, an intersection is defined as one point having at least 3 lines radiating from it. The lines of the pattern of the electrically conductive coating typically define an opening not greater than about 3 inches square, and preferably not greater than about 2 inches square. "About three inches square" typically represents a square area with approximately three inches on each side, and "about two inches square" typically represents a square area with approximately two inches on each side. For example, when a three inch square is placed on a fabric having an electrically conductive coating, it should make contact with the electrically conductive coating in at least one location. However, it is foreseeable in some instances that the edges of the fabric may have areas free from the electrically conductive coating greater than about 3 inches square. One embodiment includes a pattern comprised of a series of lines which intersect each other to form a grid pattern. The grid pattern may be diagonal. As shown, for example, in FIGS. 1 through 3, the static dissipative textile 100 displays an electrically conductive coating 200 disposed on the fabric 300 in a diagonal grid pattern 400 having one or more intersections 410. In another embodiment, such as the one shown in FIG. 4, the static dissipative textile 100 displays an electrically conductive coating 200 disposed on the fabric 300 in a pattern of connected letters or words 500 with one or more intersections 510. Additionally, a pattern may be comprised of lines which form other connecting patterns or designs such as, for example, lightning bolts. For patterns having one or more intersections as shown in FIGS. 1 through 4, a cut or break in the lines of the electrically conductive coating generally will not eliminate the static dissipative property of the textile. The electrically conductive coating may be applied to the face of the fabric, the back of the fabric, or both the face and back of the fabric.

The electrically conductive coating generally includes a conducting agent and a binding agent. The electrically conductive coating may also optionally include a dispersing agent and/or a thickening agent.

One potentially preferred, non-limiting conducting agent is graphite, such as, for example, Timrex® SFG available from Timcal Ltd. of Switzerland. Other conducting agents include, for example, Zelec® (available from Milliken Chemical of Spartanburg, S.C.); carbon particles; intrinsically conductive polymers; metal; metal oxides; metal shavings; fibers or beads coated with graphite, carbon particles, intrinsically conductive polymers, metal, metal oxides, or metal shavings; and the like; and combinations thereof. The conducting agent may be comprised of particles of various shapes, such as spheres, rods, flakes, and the like, and combinations thereof. The conducting agent may be comprised of conducting particles having a size between about 0.1 and about 100 microns, or more preferably having a size between about 1 and about 5 microns. Conducting agents may be characterized by having an aspect ratio number which is the ratio of a conducting particle's length divided by its width. For example, a perfect sphere has an aspect ratio of one. The longer the particle (i.e., the more rod-like the particle), the higher the aspect ratio. Generally, for a conducting agent having a high aspect ratio, less conducting agent is needed to provide the same electrical conductivity in an object, such as the present invention, when compared to a conducting agent made of a similar conducting agent but having a lower aspect ratio. It is generally preferable that the aspect ratio of the conductive particle of the present invention is equal to or greater than about 2. It may be more preferable that the aspect ratio be equal to or greater than about 3, and even more preferable that the aspect ratio be equal to or greater than about 4.

The binding agent included in the conductive coating of the present invention typically provides a non-conducting matrix which holds the conducting particles together and helps them bond to the fabric. Binding agents include water-borne latexes, solvent-borne polymer systems, liquid rubbers, thermoplastic hot melts, thermoset hot melts, multi-component reactive polymers, and the like, and combinations thereof. More specifically, binding agents may be acrylic latex, polyurethane, silicone, polyvinyl chloride latex, and the like, or combinations thereof. Binders generally vary, for example, in elongation and flex modulus properties which may affect the hand, drape, and stretch properties of the coated fabric. Thus, the selection of a particular binder for the conductive coating of the present invention may depend on the end-use application of the static dissipative textile. It may be preferable that the binding agent has an elongation at break equal to or greater than about 80 percent of the elongation at break of the fabric. Generally, the elongation at break of the fabric may be calculated in the direction of the fabric having the lowest elongation at break. It may be preferable that the binding agent has a glass transition temperature equal to or less than about 0 degrees C. and a melting temperature equal to or greater than about 100 C.

It is generally known to those skilled in the art of the present invention that conductivity and resistance are inversely related to each other and that a relationship exists between resistance and the amount of conducting agent present in an object. Generally, when conductivity is achieved by loading an insulating matrix with conductive particles, the conductive particles must be in contact with each other to provide a pathway for the transport of electrical current. This is typically referred to as percolation. The minimum amount of conductive particles needed to create at least one continuous pathway of particles contacting each other though the material is referred to as the percolation threshold. Below the percolation threshold, where no conductive pathways exist, the conductivity of the material is quite low and is related to the resistance of the matrix material. When the loading of conductive particles is increased to the percolation threshold, a significant jump in conductivity is generally observed. Further increases in the conductive particle loading will result in less dramatic increases in conductivity of the composite. This phenomenon of percolation is explained in great detail in several texts including "Introduction to Percolation Theory" by Stauffer and Anarony (1992 Taylor and Francis, London). The aspect ratio of the conducting particle affects the percolation threshold such that the higher the aspect ratio, the lower the percolation threshold. Thus, a conducting agent with a higher aspect ratio will typically result in the need for less conducting agent to be present in an object (i.e., less raw material) to achieve the same resistance than a conductive agent of similar composition with a lower aspect ratio. As a result, in choosing a conducting agent, the aspect ratio and percolation threshold of the conducting agent may be evaluated in determining which conducting agent will be best suited for a particular end-use. In general, the strength of a matrix will decrease with increasing loading of conductive agents. Therefore, it is generally preferable to provide an electrically conductive coating with a lower amount of conducting agent by utilizing a conductive agent with a high aspect ratio. One embodiment utilizes a conducting agent wherein the conducting agent comprises less than about 30 volume percent of the electrically conductive coating. In this instance, the conducting agent may be graphite; carbon particles; intrinsically conductive polymers; metal oxides; fibers or beads coated with graphite, carbon, intrinsically conductive polymers, metal oxides; and combinations thereof. In another example, one potentially preferred non-limiting embodiment of the present invention includes a graphite conducting agent, Timrex® SFG 15 available from Timcal Ltd. of Switzerland, with an aspect ratio of about 4 and a percolation threshold achieved at about 15 volume percent of graphite in the electrically conductive coating.

The addition of a dispersing agent to the electrically conductive coating is generally optional and may be desirable to assist in the dispersion of the conducting agent into the conductive coating. The degree of dispersion may affect the percolation threshold and conductivity. Many conducting particles, such as carbon black and graphite, generally require dispersing agents in order to prevent agglomeration in water. Agglomerated conducting particles typically will effectively lower the aspect ratio of the material and increase the percolation threshold. Dispersing agents can be non-ionic, anionic, or cationic in nature. The addition of a dispersing agent may not be necessary for conductive coatings that are not water-based. Furthermore, dispersing agents may not be necessary for use with conductive particles that are coated to facilitate dispersion or that disperse well in water. One potentially preferred, non-limiting embodiment utilizes a non-ionic surfactant as the dispersing agent. Dispersing agents are commercially available, such as, for example, Synlube® 6277A available from Milliken Chemical of Spartanburg, S.C.

The addition of a thickening agent to the conductive coating is generally optional and may be desirable to assist in the application of the coating to the fabric. The addition of a thickener generally provides control over viscosity and strike through to the uncoated side of the fabric (for instance, when only one side of the fabric is coated with the conductive coating), and the resolution of the pattern can be preserved. One potentially preferred, non-limiting embodiment incorporates an associative thickener such as a water-soluble acrylic polymer as a thickening agent. A commercially available example of an associative thickener is WTI Concentrate available from ABCO Industries, Incorporated of Roebuck, S.C. In another embodiment, the thickening agent consists of a cellulosic thickener such as Natrosol®, manufactured by Hercules Incorporated of Wilmington, Del.

Other additional chemicals may be added to the electrically conductive coating before the coating is applied to the fabric. For example, the conductive coating may include a dye or pigment so that the color of the coating matches the color of the fabric. Other additional chemicals may be added, such as, for example, those typically used for abrasion resistance, fade resistance, flame resistance, and the like, and combinations thereof.

One potentially preferred, non-limiting method for applying the conductive coating to the fabric is to apply the coating as a paste onto the fabric through screen printing. Screen printing techniques have been available for many years as a way of selectively producing a pattern on a fabric by forcing a paste through holes in a screen. For example, U.S. Pat. No. 4,365,551 to Horton; U.S. Pat. No. 4,854,230 to Niki et al.; U.S. Pat. No. 5,168,805 to Kasanami et al.; U.S. Pat. No. 5,493,969 to Takahashi et al.; and U.S. Pat. No. 6,237,490 to Takahashi et al. each describe various screen printing methods and apparatus, and are herein incorporated by reference. For purposes of the present invention, a conductive paste may be forced through a specially prepared screen onto a substrate such as a fabric. The screen typically has areas in which the mesh has been blocked. These areas, which remain impervious to the conductive paste, correspond to patterned areas on the fabric in which no conductive coating is desired. Other methods for printing substrates, such as transfer printing, lithographic printing, ink jet printing, digital printing, and the like, may also be used for applying the conductive coating to the fabric.

Prior to the coating process, the fabric may be dyed or undyed. If a dyed fabric is desired, dyeing may be accomplished by any technique known to those skilled in the art, such as, for example, by solution dyeing the fiber used to make the fabric, dyeing the formed fabric in a jet dye machine, dyeing the formed fabric using a continuous process dyeing range, or any combination thereof. Additionally, the fabric may also be subjected to various face-finishing processes prior to screen printing. For example, commonly assigned U.S. Pat. Nos. 5,822,835; 4,918,795; and 4,837,902; incorporated herein by reference, disclose a face-finishing process wherein low-pressure streams of gas are directed at high velocity to the surface of a fabric. The process ultimately softens and conditions the fabric due to vibration caused from airflow on the fabric.

Generally, the fabric of the present invention requires no pre-treatment prior to the coating process. However, in one embodiment, a pre-treatment process may be employed in order to assist in preventing the electrically conductive coating from penetrating through to the face side of the fabric. The pre-treatment process involves treating the fabric first with a cationic water-soluble polymer, such as Nalkat 62010 from Ondeo Nalco Company of Franklin, Pa., prior to applying the coating to the fabric. Treatment may be accomplished by immersion coating, padding, spraying, foam coating, or by any other technique whereby one can apply a controlled amount of a liquid suspension to an article. The fabric may optionally be dried before the conductive coating is applied. Drying can be accomplished by any technique typically used in manufacturing operations, such as dry heat from a tenter frame, microwave energy, infrared heating, steam, superheated steam, autoclaving, or the like, or any combination thereof. When pre-treatment is desired, the conductive coating may be formulated with an anionic dispersing agent. The combination of the cationic water-soluble polymer and the anionic dispersing agent typically causes the dispersion to be destroyed and the conductive coating to be largely immobilized on the surface of the fabric, thus preventing excessive penetration of the coating. An alternative approach may include utilizing an anionic water-soluble polymer in combination with a cationic dispersing agent. After the conductive coating has been applied to the fabric, the fabric is generally dried, and then the pre-treatment polymer may be washed off. Washing may be accomplished by any technique typically used in manufacturing operations, such as by running the fabric through wash boxes in a tenter frame, by scouring, and the like.

In addition to the pre-treatment process, penetration of the conducting agent into the fabric may be controlled and determined by the application technique used to apply the conductive coating onto the fabric and the chemistry and viscosity of the conductive coating. In the case of screen printing, the pressure on the printing bar or squeegee can be adjusted to either increase or decrease the penetration of the conductive coating onto the fabric. Generally, higher viscosity coating formulations will also limit penetration. It may be desirable to increase such penetration, for example, to improve the static charge bleed-through from the face to the back of the fabric. Alternatively, it may be preferable to decrease penetration, for example, to reduce see through to the uncoated side of the fabric (for instance, when only one side of the fabric is coated with the conductive coating).

In one aspect of the present invention, the process of the current invention requires no special equipment; standard textile equipment may be employed. By way of example, a fabric, either previously dyed or left undyed, is attached to a rotary screen printing machine. The desired screen is inserted on the machine, and then a conductive coating is added to the machine. One or more squeegees in the screen force a conductive paste through the holes in the screen, thereby forming a printed pattern of conductive coating on the fabric below. The fabric typically moves in a continuous fashion to a drying oven where the conductive coating is dried. Drying can be accomplished by any technique typically used in manufacturing operations, such as dry heat from a tenter frame, microwave energy, infrared heating, steam, superheated steam, autoclaving, or the like, or any combination thereof. Typically, the fabric may be dried and/or cured for between about 30 seconds and about 5 minutes at a temperature of between about 250 and about 375 degrees F. Drying typically removes the water or solvent from the binder formulation in the conductive coating. The amount of conductive coating required depends generally on the pattern chosen for the fabric, and this is typically determined by the fabric's end-use. It may be preferable that the coating coverage be between about 1% and about 50%, or even more preferably, perhaps between about 5% and about 30% as shown, for example, in FIGS. 1 through 3. The drying temperatures may vary depending on the exact chemistry and/or viscosity of the conductive coating employed in the application process. It is also contemplated that both sides of the fabric may be coated according to the method of the current invention either by simultaneously or successively coating both sides of the fabric.

After applying the electrically conductive coating to the fabric, the static dissipative textile may be tested for surface resistance using a resistivity meter. The static dissipative textile of the present invention may have a surface resistance in a range from about $10^2$ to about $10^{12}$ ohms. The textile may more preferably have a surface resistance in a range from about $10^4$ to about $10^{10}$ ohms, and even more preferably from about $10^6$ to about $10^8$ ohms. Typically, the lines of the pattern have a resistance of between about $10^6$ and about $10^{13}$ ohms per inch, or more preferably between about $10^6$ and about $10^{10}$ ohms per inch.

Following the coating process, the fabric may be further treated with one or more mechanical or chemical finishes. For example, depending on the performance characteristics desired in the end-use of the static dissipative textile, it may be desirable to add one or more chemicals such as flame resistance agents, soil release agents, pilling resistance agents, strength enhancing agents, and the like, or combinations thereof. Chemical application may be accomplished by immersion coating, padding, spraying, foam coating, or by any other technique whereby one can apply a controlled amount of a liquid suspension to a fabric. Employing one or more of these application techniques may allow the chemical to be applied to the fabric in a uniform manner.

The static dissipative textile may further comprise at least one layer of a second fabric disposed adjacent to the electrically conductive coating. The second fabric may be woven, knitted, or nonwoven fabric. Alternatively, the static dissipative textile may further comprise at least one layer of foam material disposed adjacent to the electrically conductive coating. The foam material may be polyurethane, polystyrene, polyether, polyester, silicone, acrylic, olefin, or the like, and combinations thereof. Either of the alternative composite materials may further include one or more additional layers of woven, knitted, or nonwoven fabric; one or more layers of film; one or more layers of adhesive; or combinations thereof. The various layers of the composite material may be held together with adhesive or secured together by heat or flame lamination and the like. The composite material may be used, for example, in automobile interiors, such as in automotive upholstery, wherein the upholstery fabric is typically adhered to a polyurethane foam backing through the use of an adhesive or possibly with heat lamination. The composite material may be applicable for use in other areas such as, for example, in residential or commercial upholstery or in carpeting.

The following examples illustrate various embodiments of the present invention but are not intended to restrict the scope thereof.

Static Test:

The relative propensity for a fabric to generate static build-up was tested using a device developed at Milliken & Company in Spartanburg, S.C. The test is currently used to certify the anti-static performance of automotive seating and is further described in the proceedings of the 2002 EOS/ESD Symposium, available from the ESD Association, 7900 Turin Road, Building 3, Suite 2, Rome, N.Y. A schematic drawing of the testing machine is shown in FIG. 8 and FIG. 9. FIG. 8 shows the testing device 10 supported by stand 22. The testing device 10 used a pressurized air cylinder 18 to pull a carriage 20 across the face of a 3×9 inch piece of fabric 12 in a controlled environment where the temperature was about 72 degrees F. and the relative humidity was about 12%. A polytetrafluoroethylene (PTFE) block 14 having about a 1.5 square inch face was positioned inside the carriage 20. A 1.6-kg weight 16 was placed on top of the PTFE block 14. The PTFE block 14 was dragged across the surface of the fabric 12 as the carriage 20 was pulled by the pressurized air cylinder 18. FIG. 9 shows the PTFE block 14 was then dropped into a Faraday cup 24, which was connected by wire 26 to a charge meter 28. The net charge was measured with a Model 284 Nanocoulomb Meter from Monroe Electronics of Lyndonville, N.Y. This charge was equal to the static build-up on the fabric 12. The test was designed to mimic the actions of a person sliding in and out of a car. It provided an automated, statistically reproducible method for quantifying the static performance of fabrics and other flat materials.

Bounce Test:

The fabric's ability to withstand stress was tested using a cyclic impact tester developed by Milliken & Company in Spartanburg, S.C. A 75-pound weight was dropped 100,000 times from a height of about 2 inches above the surface of the static dissipative fabric at a rate of 20 drops, or cycles, per minute. The contact area of the bottom of the weight was a circle having about a ten-inch diameter. The number of cycles were counted and stored electronically.

EXAMPLE 1

A 100% polyester double needle bar knit fabric which had been previously jet dyed, was screen printed with an electrically conductive coating in the form of a paste in a diagonal grid pattern as shown in FIG. 3. The conductive coating was made by mixing together 1314 grams of Timrex® SFG 15 graphite which has an aspect ratio of 4 (available from Timcal Ltd.), 79 grams of Synlube® 6277A (available from Milliken Chemical), and 12 pounds of water until the graphite was dispersed. To this mix, 14.88 pounds of an acrylic latex emulsion, T-91 (available from Noveon), was added. The mix was then thickened to a viscosity of 5000 Cps using an acrylic thickener, WTI Concentrate (available from ABCO Industries, Incorporated).

The conductive coating was screen printed on the back of the fabric in a diagonal grid pattern, as shown in FIG. 3, at a magnet pressure of 4 with a 12 pound bar on a Stork rotary screen printing machine at a speed of 15 yards per minute. The fabric was then dried for 1 minute in a belt drier at 310 degrees F. The resulting static dissipative fabric was tested using the Static Test described above. The surface resistance of the printed fabric was $10^6$ ohms. The fabric was also tested for Flammability (FMVSS 302) and achieved a SENBR rating. In addition, the presence of the conducting grid on the back of the fabric was found to have no adverse effect on fogging, seam slippage, lightfastness, hand, or appearance of the fabric. Submitting the sample to crumple, flex-fold, and stretch testing challenged the durability of the conductivity of the grid. These tests are well known to those skilled in the art of testing automotive fabrics. The fabric showed no significant or permanent loss of conductivity. It is known to those skilled in the art that many of the tests used for automotive standards are typically more stringent than requirements for other fabric end-uses. Thus, the printed fabric would likely be ideally suited for use as automotive upholstery fabric; residential or commercial upholstery; cleanroom garments, wipes, and mops; napery; and apparel.

EXAMPLE 2

Grid line spacing has been considered in relation to triboelectric, or static, charge. The fabric and process parameters as described in Example 1 were used to create four diagonal grid patterns having grid line spacing from 1.6 inches to 0.5 inches. A solid film of the conductive coating was also printed on the fabric. The resulting static dissipative fabrics were tested using the Static Test described above. The Static Test showed that as the grid lines were printed closer together, the triboelectric charge of the fabric decreased. This resulted in the creation of fabrics having increasingly higher static dissipative properties as the grid lines were printed closer together. The results are shown in FIG. 6 and Table 1.

Accordingly, it may be preferable to apply the electrically conductive coating to the fabric with line spacing in a range from about 0.2 to about 10 inches. It may be more preferable to apply the electrically conductive coating to the fabric with line spacing in a range from about 0.5 to about 2 inches.

EXAMPLE 3

Line width has also been considered in relation to triboelectric, or static, charge. The fabric and process parameters as described in Example 2 were used except that the fabric was printed with two different line widths, 1 millimeter (0.0394 inches) and 2 millimeters (0.0788 inches). The resulting static dissipative fabrics were tested using the Static Test described above. The Static Test showed generally that line width has little bearing on charge dissipation provided the line width is sufficient to obtain measurable conductivity. The results are shown in FIG. 6 and Table 1. Line width sufficient of obtain measurable conductivity may preferably be in a range from about 0.01 to about 0.5 inches. Line width to obtain measurable conductivity may more preferably be in a range from about 0.03 to about 0.2 inches.

TABLE 1

Effect of Grid Line Spacing and Line Width on Static Performance

| Line Spacing (inches) | Line Width (millimeters) | Triboelectric Charge (nC) |
| --- | --- | --- |
| Control (no treatment) | | 50.5 |
| 1.6 | 1 | 32 |
| | 2 | 31 |
| 1.4 | 1 | 27 |
| | 2 | 27.5 |
| 1.0 | 1 | 22 |
| | 2 | 21.3 |
| 0.5 | 1 | 18 |
| | 2 | 17.6 |
| 0 (solid film) | | 14 |

EXAMPLE 4

The fabric as described in Example 1 was prepared using two different binding agents. One fabric was prepared with T-91 acrylic latex (available from Noveon) and a second one was prepared with Sancure 861 urethane (also available from Noveon). Both electrically conductive coatings were made with a 28% weight loading (15 volume percent) of Timcal® SFG 15 graphite (weight loading is calculated by dividing the weight of graphite by the weight of the total solids). Both fabrics were screen printed with a diagonal grid pattern as shown in FIG. 3. These printed fabrics were tested for durability using the Bounce Test described above. The results are shown in FIG. 7 and Table 2. ("Before" represents the triboelectric charge on the fabric before the Bounce Test, and "After" represents the triboelectric charge on the fabric after the Bounce Test.) The charge was measured using the Static Test described above. The surface resistance was measured using a Model 385 Resistivity Meter from ACL, Inc. of Elk Grove, Ill. The fabrics were able to withstand the force of a 75-pound weight dropped 100,000 times on the fabrics without decreasing the effectiveness of the fabrics' ability to dissipate static electricity. This test emphasized the durability of the electrically conductive pattern screen printed on the surface of the fabrics.

TABLE 2

Durability of Fabric to Bounce Test

| Line Spacing (inches) | | Surface resistance (ohms) | Triboelectric Charge (nC) |
|---|---|---|---|
| Control (no treatment) | | >$10^{12}$ | 40 |
| Acrylic | Before | $10^7$ | 28 |
|  | After | $10^7$ | 28 |
| Urethane | Before | $10^7$ | 29 |
|  | After | $10^7$ | 27 |

The above description and examples disclose the inventive static dissipative textile having an electrically conductive surface wherein the static dissipative textile typically comprises a fabric. The electrically conductive surface is generally comprised of a pattern of lines which provides relatively permanent static dissipation properties and conducts electric charge at virtually any humidity, while the electrically conductive surface does not detrimentally affect the overall appearance or tactile properties of the fabric. The electrically conductive surface may be achieved by screen printing the fabric with an electrically conductive coating comprised of a conducting agent and a binding agent, and optionally a dispersing agent and/or a thickening agent. The fabric may be ideal for incorporation into articles of automotive upholstery; commercial and residential upholstery; cleanroom garments, wipes, and other cleanroom accessories such as mops; napery; apparel; and any other article wherein it is desirable to manufacture a static dissipative fabric having an electrically conductive surface.

These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the scope of the invention described in the appended claims.

We claim:

1. A static dissipative textile comprising a fabric, the fabric comprising a plurality of fibers, the fabric having a first surface and a second surface opposite the first surface, the fabric consisting of an electrically conductive coating on the first surface of the fabric, the static dissipative textile further consisting of a chemical finish on the second surface of the fabric, the chemical finish contacting at least a portion of the fibers on the second surface of the fabric, wherein the chemical finish comprises a pilling resistance agent.

2. The static dissipative textile of claim 1, wherein the electrically conductive coating exhibits a resistance of between about $10^7$ and about $10^{10}$ ohms per inch.

3. The static dissipative textile of claim 1, wherein the electrically conductive coating comprises particles characterized by a size of between about 0.1 and about 100 microns.

4. The static dissipative textile of claim 1 wherein the electrically conductive coating comprises a conducting agent and a binding agent, the binding agent comprising a material selected from the group consisting of waterborne latexes, solvent-borne polymer systems, liquid rubbers, thermoplastic hot melts, thermoset hot melts, multi-component reactive polymers, and combinations thereof.

5. The static dissipative textile of claim 1, wherein the first surface of the fabric is coated with the electrically conductive coating in a pattern comprised of a plurality of lines.

6. The static dissipative textile of claim 1, wherein the chemical finish on the second surface of the fabric further consists of a flame resistance agent.

7. The static dissipative textile of claim 1 wherein the chemical finish on the second surface of the fabric is applied by foam coating.

8. The static dissipative textile of claim 1 wherein the chemical finish on the second surface of the fabric is applied by padding.

9. The static dissipative textile of claim 1 wherein the chemical finish on the second surface of the fabric is applied by spraying.

10. In a seat suitable for use in an automobile or other vehicle, the seat comprising an upholstery material covering a cushioning material, the improvement comprising an upholstery material comprising a static dissipative textile, the static dissipative textile consisting of a fabric having a first surface and a second surface opposite the first surface, the fabric consisting of an electrically conductive coating disposed on the first surface of the fabric in a pattern adapted for conducting electricity, the electrically conductive coating comprising a conducting agent and a binding agent, the static dissipative textile further consisting of a chemical finish on the second surface of the fabric, the chemical finish contacting at least a portion of the fibers on the second surface of the fabric, wherein the chemical finish comprises a pilling resistance agent wherein the first surface of the static dissipative textile is adapted to be disposed adjacent to the cushioning material of the seat, the textile further consisting essentially of a chemical finish disposed on the second surface of the fabric, the chemical finish contacting at least a portion of the fibers on the second surface of the fabric.

11. A static dissipative textile comprising a fabric, the fabric comprising a plurality of fibers, the fabric having a first surface and a second surface opposite the first surface, the fabric consisting essentially of an electrically conductive coating on the first surface of the fabric wherein the electrically conductive coating is only applied to one surface of the static dissipative textile, the static dissipative textile further consisting of a chemical finish on the second surface of the fabric, the chemical finish contacting at least a portion of the fibers on the second surface of the fabric, wherein the chemical finish comprises a pilling resistance agent wherein the electrically conductive coating exhibits a resistance of between about $10^7$ and about $10^{10}$ ohms per inch.

12. The static dissipative textile of claim 11, wherein the electrically conductive coating comprises particles characterized by a size of between about 0.1 and about 100 microns.

13. The static dissipative textile of claim 11 wherein the electrically conductive coating comprises a conducting agent and a binding agent, the binding agent comprising a material selected from the group consisting of waterborne latexes, solvent-borne polymer systems, liquid rubbers, thermoplastic hot melts, thermoset hot melts, multi-component reactive polymers, and combinations thereof.

14. The static dissipative textile of claim 11, wherein the first surface of the fabric is coated with the electrically conductive coating in a pattern comprised of a plurality of lines.

15. The static dissipative textile of claim 11, wherein the chemical finish on the second surface of the fabric comprises a flame resistance agent.

* * * * *